(12) United States Patent
Ueda

(10) Patent No.: US 6,393,940 B1
(45) Date of Patent: May 28, 2002

(54) GAP ADJUSTING MECHANISM FOR BICYCLE PEDAL

(75) Inventor: Yutaka Ueda, Tondabayashi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/027,292

(22) Filed: Feb. 20, 1998

(51) Int. Cl.[7] ................................................. G05G 1/14
(52) U.S. Cl. ................................... 74/594.6; 74/594.4
(58) Field of Search ............................ 74/594.4, 594.6; 36/131, 132; D12/125

(56) References Cited

U.S. PATENT DOCUMENTS

| 562,546 | A | | 6/1896 | Law | |
|---|---|---|---|---|---|
| D284,459 | S | * | 7/1986 | Shimizu | D12/125 |
| 4,599,915 | A | | 7/1986 | Hlavac et al. | 74/594.4 |
| D286,995 | S | * | 12/1986 | Pai | D12/125 |
| 4,838,115 | A | | 6/1989 | Nagano | 74/594.6 |
| 4,840,085 | A | | 6/1989 | Nagano | 74/594.4 |
| 5,048,369 | A | * | 9/1991 | Chen | 74/594.6 |
| 5,115,692 | A | * | 5/1992 | Nagano | 74/594.4 |
| 5,203,229 | A | | 4/1993 | Chen | 74/594.6 |
| 5,259,270 | A | * | 11/1993 | Lin | 74/594.6 |
| 5,417,128 | A | | 5/1995 | Beyl | 74/594.6 |
| 5,419,218 | A | * | 5/1995 | Romano | 74/594.6 |
| 5,423,233 | A | * | 6/1995 | Peyre et al. | 74/594.6 |
| 5,557,985 | A | * | 9/1996 | Nagano | 74/594.6 |
| D387,706 | S | * | 12/1997 | Hanmura | D12/125 |
| 5,784,930 | A | * | 7/1998 | Ueda | 74/594.6 |
| 5,784,931 | A | * | 7/1998 | Ueda | 74/594.6 |
| 5,802,930 | A | | 9/1998 | Chen | 74/594.6 |
| 5,992,266 | A | * | 11/1999 | Heim | 74/594.6 |
| 6,014,914 | A | * | 1/2000 | Ueda | 74/594.6 |
| 6,119,551 | A | * | 9/2000 | Ueda | 74/594.6 |

FOREIGN PATENT DOCUMENTS

| EP | 0619 219 A1 | * 10/1994 | ................ 74/594.6 |
|---|---|---|---|
| EP | 753453 A | 1/1997 | |
| EP | 753454 A | 1/1997 | |

* cited by examiner

*Primary Examiner*—Vinh T. Luong
(74) *Attorney, Agent, or Firm*—Shinjyu Global IP Counselors, LLP

(57) ABSTRACT

A bicycle pedal has a pedal body and a cage rotatably supported on a pedal spindle for supporting a rider's foot. The pedal spindle is fastened to a crank of a bicycle in a conventional manner. Preferably, the pedal body is a step-in pedal with a cleat engagement mechanism coupled to each side for releasably retaining a cleat of a bicycle shoe therein. The cage surrounds the pedal body and is coupled to the pedal body by a biasing member. The biasing member permits limited angular rotation between the pedal body and the cage such that the pedal body and the cage normal rotate together about the pedal spindle. An adjustment mechanism is coupled between the pedal body and the cage to change the angular position of cage relative to pedal body.

32 Claims, 4 Drawing Sheets

GAP ADJUSTING MECHANISM FOR BICYCLE PEDAL

BACKGROUND OF THE INVENTION

1. Field of the Invention

This invention generally relates to bicycle pedals. More specifically, the present invention relates to a bicycle pedal having a cage surrounding a clipless pedal body such that the rider's shoe can engage the pedal with or without the cleat of the bicycle shoe being attached to the clipless pedal body.

2. Background Information

In recent years, bicycle pedals have been designed for specific purposes such as for pleasure, off road biking, road racing, etc. One particular type of bicycle pedal which is gaining more popularity, is the step-in or clipless pedal which releasably engages a cleat secured to the sole of a cyclist's shoe. The clipless pedal has a pedal spindle that can be mounted on the crank of a bicycle, a pedal body that is rotatably supported on this pedal spindle, and at least one cleat engagement mechanism with a pair of front and rear cleat clamping members that are fixed on either side or both sides of the pedal body for engaging front and rear portions of a cleat. In this type of bicycle pedal, the rider steps onto the pedal and the cleat engagement mechanism automatically grips on to the cleat secured to the bottom of the cyclist's shoe.

More specifically, when attaching the cyclist's shoe to the step-in pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

When step-in pedals are used for road type bikes, the pedal is typically only provided with a single clamping assembly such that the cyclist's shoe can only be coupled to one of the two sides of the pedal. Off road or mountain type bikes, on the other hand, usually have a pair of clamping assemblies such that the cyclist's shoe can be clamped to either side of the pedal. In either case, it is desirable to design the pedal to be as compact and light weight as possible.

One problem with most clipless pedals is that they are quite small such that only small portions of the pedal body engages the rider's shoe. Specifically, the pedal body has a tread surface located on both sides of the cleat engagement mechanism. This tread surface has only a small surface area because the pedal body is typically made as small as possible so that it will be lightweight. With this type of clipless pedal, the shoe and the pedal are in a state of constant engagement when the cleat clamping is engaged in the cleat clamping members, so the pedaling force can be transmitted efficiently to the pedals. As a result, clipless pedals are widely employed on racing bicycles used in road racing and mountain bike racing.

With this type of clipless pedal, if the shoe and the pedal are loose to the right and left around the cleat clamping members, then the rider's foot will wobble to the right and left and the rider's pedaling force will not be transmitted efficiently to the pedal. Therefore, any looseness to the right and left between the shoe and pedal should be suppressed to a minimum by having the rubber portion of the shoe sole come into contact on the right and left of the cleat with a tread surface provided to the pedal body.

The conventional structure described above merely consists of bringing the rubber portion of the shoe sole into contact with a tread surface having a tiny surface area in order to suppress looseness to the right and left of the shoe. Therefore, the contact length is minimal, and it is difficult to suppress properly the looseness to the right and left. Moreover, since the portion of the shoe sole that is in contact with the tread surface is the same portion that comes into contact with the ground when the rider is walking, it tends to wear down, and when this portion of the sole wears down, the tread surface and the shoe sole no longer come into contact uniformly, making it difficult to suppress the looseness between the shoe and pedal.

Downhill races, dual slalom races, cross-country races, and other such off-road races for mountain bikes and BMX (bicycle motocross) have been widely staged in recent years. In this type of off-road race, unlike in road racing, the riders traverse an unpaved track. Furthermore, with this type of off-road racing the foot must be repeatedly taken off the pedal during cornering and replaced on the pedal after the corner has been exited. Unfortunately, since the racing is performed on unpaved roads, mud clings to the pedals and tends to clog the cleat clamping members. Once the cleat clamping members become clogged with mud, the cleat cannot be engaged in the cleat clamping members, and the shoe cannot be attached to the pedal.

When a cleat cannot be engaged with the cleat clamping members because of mud clogging, or when the rider's feet are frequently removed from the pedals, the rider must often step on the pedal without the cleat being completely engaged in the cleat clamping members. However, since the pedal bodies of the above-identified conventional clipless pedals are typically as small as possible and only have small tread surface areas, the rider's foot would slip off the pedal when the cleat was not engaged with the cleat clamping members. As a result, the rider's pedaling force is not transmitted efficiently to the pedals, and the speed of the bicycle drops. Lower speed is a critical problem for a racer. Accordingly, when it is expected that the pedals will become clogged with mud or the shoes will be taken off and replaced on the pedals frequently in this type of off-road race, more and more riders are using ordinary double-sided pedals rather than clipless pedals. Such pedals have no cleat engagement mechanisms, but they provide a good grip to the shoes in muddy situations. However, in either case, the cyclist does not have an optimum apparatus for pedaling the bicycle.

For a step-in or clipless pedal to be usable in such muddy situations, it must be possible for the rider to step on the pedal stably even when the cleat is not engaged with the cleat clamping members. One possible means for achieving this could be to provide a wider tread cage on the pedal around the outside of the cleat clamping members so that more tread surface can come into contact with the shoe sole such as disclosed in European Patent Application No. 753, 453 and European Patent Application No. 753,454. However, a mountain bike shoe differs from a road shoe in that the cleat is recessed into the shoe sole to make walking more comfortable. Thus, if a wide tread cage is provided around the outside of the cleat engagement mechanism, then the tread cage will interfere with the shoe sole and get in the way when the cleat is being engaged with the cleat engagement members. This, in turn, limits the engagement direction of the shoe. Consequently, when the shoe is inserted from a direction other than the engagement direction, it will be difficult to quickly re-engage the cleat with the cleat engagement mechanism even if there is no mud clogging or the like.

In view of the above, it is apparent that there exists a need for a clipless bicycle pedal which limits wobbling. Moreover, there exists a need for a bicycle pedal which can accommodate different types of sole designs of bicycle shoes. This invention addresses these needs in the art, along with other needs which will become apparent to those skilled in the art once given this disclosure.

SUMMARY OF THE INVENTION

One object of the present invention is to provide a bicycle pedal with a step-in pedal body which is at least partially surrounded by a cage that is adjustable relative to the step-in pedal body.

The foregoing objects can basically be attained by providing a bicycle pedal for attachment to a cleat fixed to a bicycle shoe, comprising a pedal shaft having a center longitudinal axis of rotation; a pedal body rotatably coupled to the pedal shaft with a first cleat engagement mechanism coupled to a first side of the pedal body; a cage with a first tread surface coupled to the pedal body; and an adjustment mechanism coupled between the pedal body and the cage to change relative angular position between the first tread surface and the first cleat engagement mechanism.

The present invention can also be carried out by providing a bicycle pedal for attachment to a cleat fixed to a bicycle shoe, comprising a pedal shaft having a center longitudinal axis of rotation; first pedal member, rotatably coupled to the pedal shaft for attachment to the cleat of the bicycle shoe; second pedal member, movably coupled to the first pedal member, for engaging a sole portion of the bicycle shoe; and an adjustment member for adjusting relative angular position of first and second pedal means relative to each other.

The present invention is further carried out by providing a bicycle pedal for attachment to a cleat fixed to a bicycle shoe, comprising a pedal shaft having a center longitudinal axis of rotation; a pedal body rotatably coupled to the pedal shaft with a first cleat engagement mechanism coupled to a first side of the pedal body; a cage rotatably coupled to the pedal shaft about the center longitudinal axis and movably coupled to the pedal body for limited movement relative to the first cleat engagement mechanism; and an adjustment mechanism coupled between the pedal body and the cage to change relative angular position between the pedal body and the cage.

Other objects, advantages and salient features of the present invention will become apparent to those skilled in the art from the following detailed description, which taken in conjunction with the annexed drawings, discloses preferred embodiments of the present invention.

BRIEF DESCRIPTION OF THE DRAWINGS

Referring now to the attached drawings which form a part of this original disclosure:

FIG. 5A is an end elevational view of the torsion spring illustrated in FIG. 6 with the connection of the torsion spring between the pedal body and the cage being schematically illustrated with boxes;

DETAILED DESCRIPTION OF THE PREFERRED EMBODIMENTS

Figure 1:
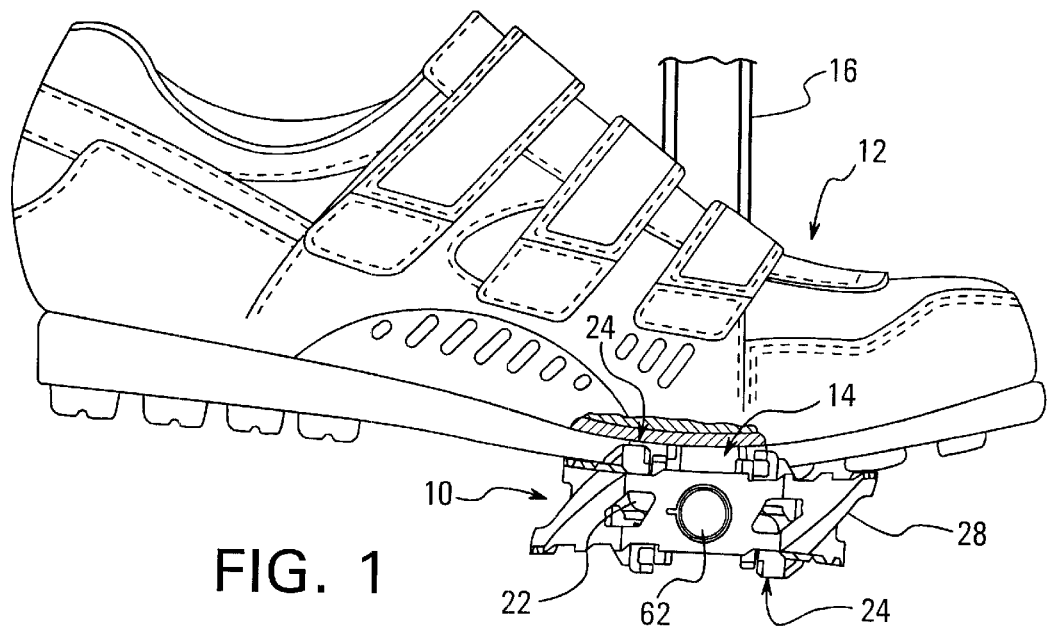
FIG. 1 is an outside elevational view of a bicycle shoe attached to a right bicycle pedal having a clipless pedal body and a cage in accordance with a first embodiment of the present invention.

Referring initially to FIGS. 1 through 4, a bicycle pedal 10 is illustrated in accordance with the first embodiment of the present invention. Bicycle pedal 10 is a clipless or step-in pedal that can be used with a bicycle shoe 12 with a cleat 14 coupled thereto. Bicycle pedal 10 is especially designed for use with off-road bicycles as opposed to use with a road bicycle. Of course, bicycle pedal 10 can be used on a road bicycle or any type of bicycle if needed and/or desired. As seen in FIG. 1, bicycle pedal 10 is fixedly coupled to bicycle crank 16 of a bicycle for rotation therewith. The bicycle pedal 10 illustrated in the drawings is a right side pedal. Of course, the same pedal is provided on the left side of the bicycle with the left side pedal being the mirror image of the right side pedal 10. Thus, the description will be made herein with reference to only one of the pedals.

Figure 2:
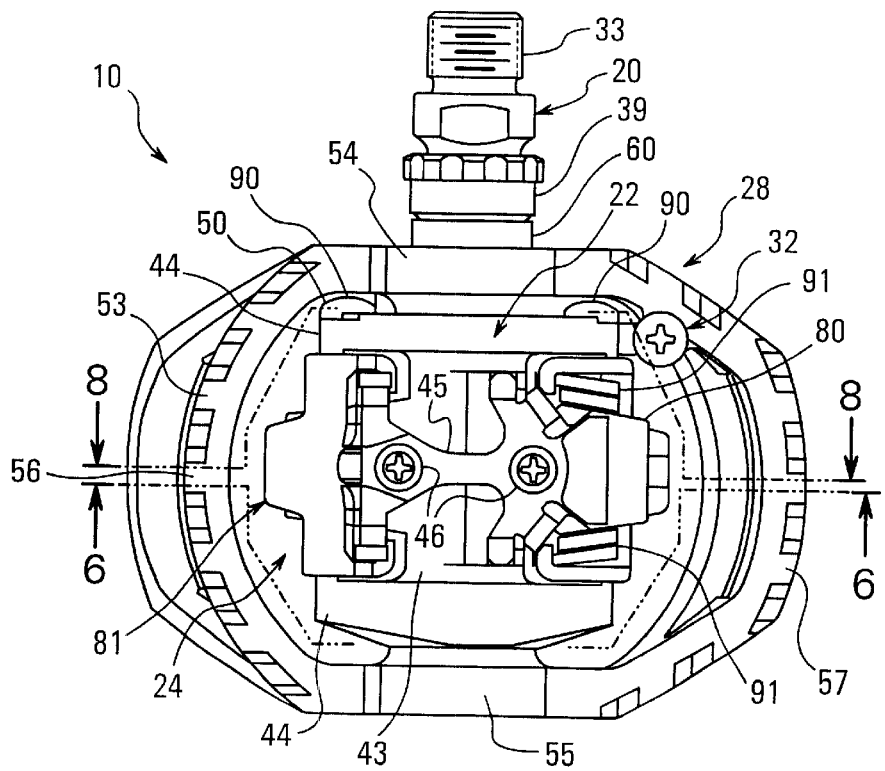
FIG. 2 is a top plan view of a right bicycle pedal illustrated in FIG. 1 with the adjustment mechanism set at 0°.

As seen in FIG. 2, bicycle pedal 10 basically includes a pedal shaft or spindle 20, a pedal body 22 with first and second cleat engagement mechanisms 24, a cage 28 surrounding pedal body 22, a biasing member 30, and an adjustment mechanism 32 to change the angular position of cage 28 relative to pedal body 22. As shown in FIG. 1, pedal spindle 20 is fastened to crank 16 of a bicycle, with pedal body 22 and cage 28 both being rotatably coupled to pedal spindle 20 for supporting a rider's foot. Specifically, cleat 14 is fixedly attached to bicycle shoe 12 which in turn is releasably attached to pedal body 22 via one of the cleat engagement mechanisms 24 in a conventional manner. Of course, the sole of bicycle shoe 12 can directly engage cage 28 without being coupled to one of the cleat engagement mechanisms 24. Cage 28 is positioned around pedal body 22 and is rotatably supported relative to pedal body 22 about pedal spindle 20. Pedal body 22 and cage 28 form a pair of pedals, e.g., first and second pedals.

Figure 5:
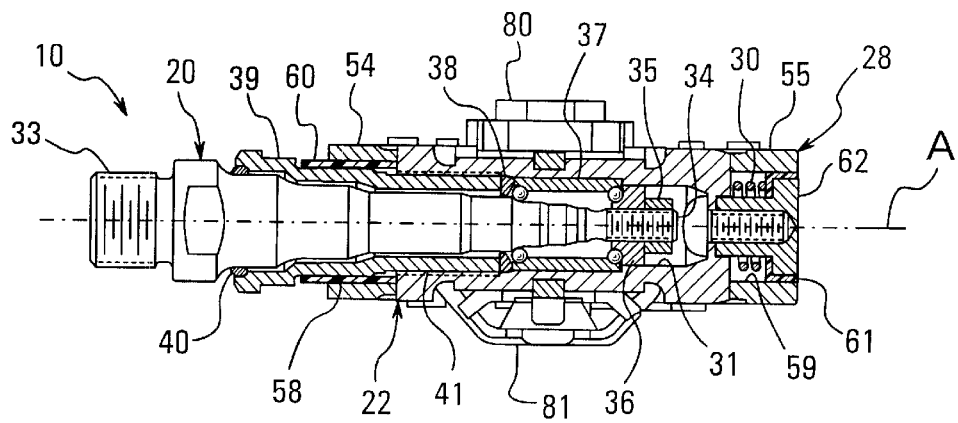
FIG. 5 is a transverse cross-sectional view of the right bicycle pedal illustrated in FIGS. 1 through 4 as seen along section line 5—5 of FIG. 3.

As shown in FIG. 5, the pedal spindle 20 is a multi-step spindle having numerous stepped portions which is received in a stepped bore 31 formed in pedal body 22. Pedal spindle 20 has a first end 33 with threads formed thereon for threadedly coupling pedal 10 to crank 16 in a conventional manner. The other end 34 of pedal spindle 20 rotatably supports pedal body 22 and cage 28. In particular, end 34 of spindle 20 has threads formed thereon for threadedly receiving lock nut 35 which secures pusher 36, bearing assembly 37, ring 38, sleeve or tube 39 and gasket 40 on pedal spindle 20. Since these parts are relatively conventional parts and the specific constructions of these parts are not critical to the present invention, they will not be discussed in detail herein. Rather, these parts will only be discussed as necessary to understand the present invention.

Bearing assembly 37 rotatably supports pedal body 22 on pedal spindle 20 so that pedal body 22 can freely rotate about the center longitudinal axis A of pedal spindle 20. Sleeve 39, on the other hand, is fixedly coupled to pedal body 22 so that pedal body 22 rotates with sleeve 39. More specifically, the inner end 41 of sleeve 39 is threadedly coupled within the stepped bore 31 of pedal body 22.

As shown in FIG. 2, pedal body 22 has a center portion 43 and a pair of side portions 44 that are rotatably supported by pedal spindle 20 for rotation about center longitudinal axis A. Pedal body 22 is preferably made of a lightweight material such as an aluminum alloy. One of the cleat engagement mechanisms 24 is located on each side of pedal body 22. Side portions 44 extend forward and backward from center portion 43, and are located on opposite sides of the cleat engaging mechanisms 24. Between the pair of side portions 44, center portion 43 defines an engagement fixing surface 45 on each side of pedal body 22 that serves to fix the cleat engagement mechanisms 24 thereto via screws 46.

Cage 28 is preferably made of a lightweight material such as an aluminum alloy. Cage 28 surrounds pedal body 22 and is rotatably mounted on pedal spindle 20 for rotation about center longitudinal axis A. Biasing member or spring 30 biases pedal body 22 and cage 28 in opposite directions. As best seen in FIGS. 6 through 9, a stop member or abutment 50 is positioned on cage 28 to engage one of the side portions 44 of pedal body 22 to limit rotational movement between pedal body 22 and cage 28. In this position, the horizontal center plane B of pedal body 22 forms approximately a 12.5° angle with the horizontal center plane C of cage 28 such that the rearward ends of cleat engagement mechanisms 24 lie below the surface of cage 28. It will be apparent to those skilled in the art that the location and construction of stop member 50 can be changed as needed and/or desired. For example, stop member 50 could be formed on pedal body 22 for engaging a portion of cage 22. The frame of cage 28 is in the form of a compressed octagon or compressed oval (in plan view) and includes has a first tread surface 53 on each side for engaging the sole portion of bicycle shoe 12.

Cage 28 has a pair of parallel side sections 54 and 55, a pair of end sections 56 and 57. Side sections 54 and 55 have holes 58 and 59, respectively, which have bushings 60 and 61 positioned therein. Bushing 60 is frictionally retained on sleeve 39 so that cage 20 can rotate relative sleeve 39 and pedal body 22. Bushing 61 surrounds a plug 62 such that cage 28 rotates relative to plug 62. Plug 62 is secured to pedal body 22 by screw 63. Spring 30 is located within hole 59 of cage 28 between pedal body 22 and plug 62.

Figure 6:
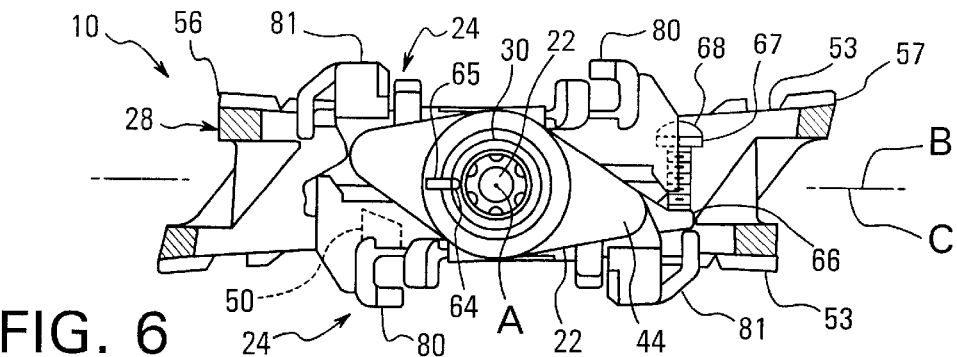
FIG. 6 is a cross-sectional view of the right bicycle pedal illustrated in FIGS. 1 through 5 as seen along section line 6—6 of FIG. 2 with the adjustment mechanism set at 0° (first angular position)
Figure 7:
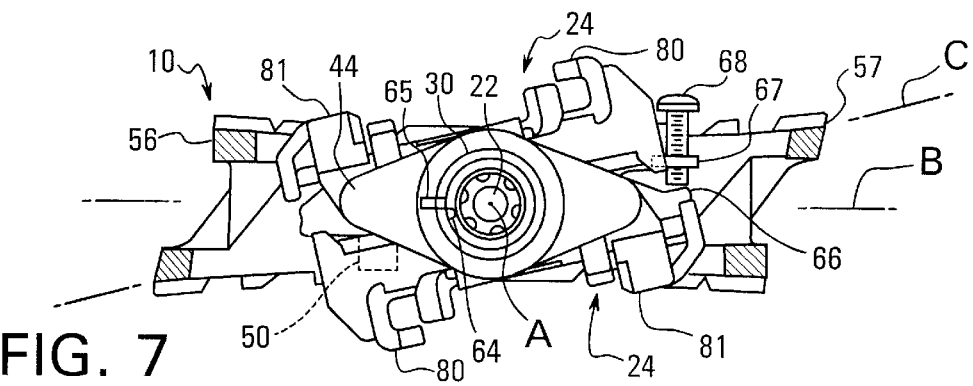
FIG. 7 is a cross-sectional view, similar to FIG. 6, of the right bicycle pedal illustrated in FIGS. 1 through 6 with the adjustment mechanism set at approximately 12.5° (second angular position)
Figure 8:
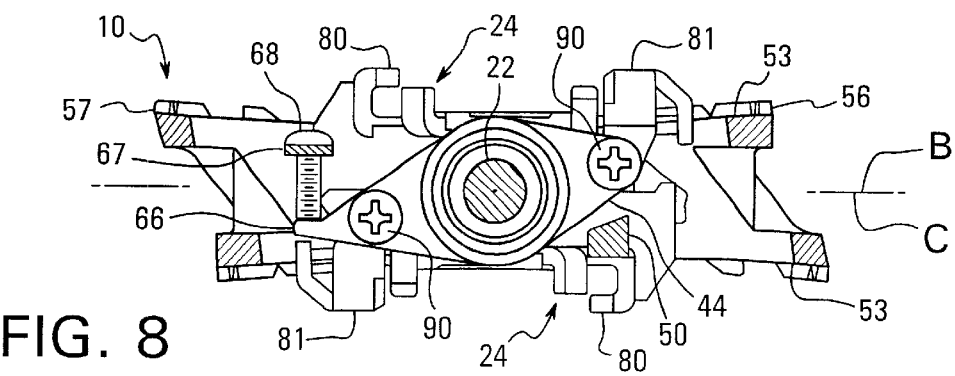
FIG. 8 is a cross-sectional view of the right bicycle pedal illustrated in FIGS. 1 through 6 as seen along section line 8—8 of FIG. 2 with the adjustment mechanism set at 0° (first angular position)
Figure 9:
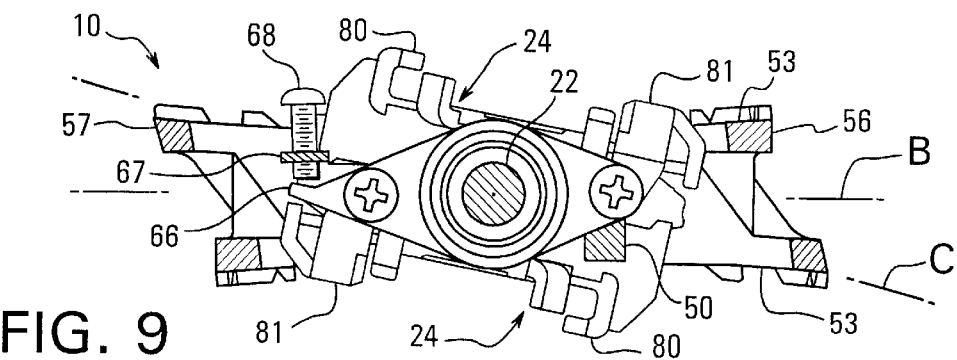
FIG. 9 is a cross-sectional view, similar to FIG. 8, of the right bicycle pedal illustrated in FIGS. 1 through 8 with the adjustment mechanism set at approximately 12.5° (second angular position)

Cage 28 is coupled to pedal body 22 so that cage 28 rotates with pedal body 22 about the center longitudinal axis A of pedal spindle 20. Specifically, biasing member 30 couples cage 28 to pedal body 22 for rotation therewith. Biasing member 30 in the preferred embodiment is a torsion spring with a first end 64 coupled within a recess or hole formed in the end of pedal body 22 and a second end 65 coupled within a recess formed in cage 28 as diagrammatically illustrated in FIG. 5A. Spring 30 is preloaded such that pedal body 22 and cage 28 are biased in opposite directions. In particular, spring 30 biases pedal body 22 in a counter clockwise direction as seen in FIGS. 6 and 7, while cage 28 is biased in a clockwise direction by spring 30. Rotational movement is limited by stop member 50 engaging pedal body 22. Accordingly, limited rotational movement is provided between pedal body 22 and cage 28. The amount of rotational movement between pedal body 22 and cage 28 is controlled by adjustment mechanism 32.

Referring to FIGS. 2, and 6 through 9, adjustment mechanism 32 includes a first abutment 66 formed on pedal body 22, a second abutment 67 formed on cage 28, and an adjustment member or screw 68 interposed between abutments 66 and 67. While screw 68 is illustrated as being threadedly coupled to abutment 67 formed on cage 28, it will be apparent to those skilled in the art from this disclosure that screw 68 could be threadedly coupled to abutment 66. Preferably, when screw 68 is fully threaded into abutment 67, such that the head of the screw bottoms out on abutment 66, the relative angular position between center planes B and C of pedal body 22 and cage 28, respectively, is approximately 0°. Of course, screw 68 can be longer such that pedal body 22 is angled in the opposite direction relative to cage 28. When screw 68 is either removed or unthreaded so that the tip of screw 68 does not engage abutment 66, the relative angular position between center lines B and C of pedal body 22 and cage 28, respectively, is approximately 12.5°. In particular, stop member 50 of cage 28 engages one of the side portions 44 of pedal body 22 to prevent further rotational movement therebetween. In other words, the angular position of pedal body 22 relative to cage 28 can be infinitely adjusted between at least 0° to at least 12.5° such that at least two different relative angular positions can be maintained as seen in FIGS. 6 and 7.

Cleat engagement mechanisms 24 selectively engage cleat 16 of bicycle shoe 12 to attach the sole of a bicycle shoe 12 to pedal 10. Each of the cleat engagement mechanisms 24 has a front cleat engagement member 80 that engages the front portion of cleat 16 and a rear cleat engagement member 81 that engages the rear portion of cleat 16. Cleat engagement mechanisms 24 are well know in the art, and thus will only be briefly discussed herein.

The front cleat engagement member 80 is symmetrical to the left and right of the center line of pedal 10. Cleat engagement member 80 is rigidly attached to the engagement fixing surface 45, and has a cleat clamping member or portion that curves out in a U-shape above the front of engagement fixing surface 45.

Rear cleat engagement member 81 is curved in a roughly inverted U-shape, with its two ends being swingably supported by a fixed shaft 90 (see FIGS. 7 and 8) that passes between the side portions 50 of pedal body 22. A pair of canceling springs 91 are wound around the outside of this fixed shaft 90 for biasing rear cleat engagement member 81 such that it always rotates forward (the direction of the arrow in FIGS. 7 and 8).

Figure 4:
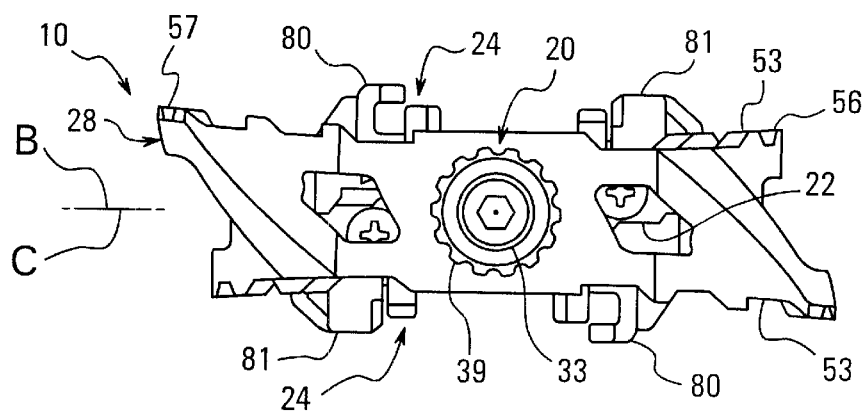
FIG. 4 is an inside elevational view of the right bicycle pedal illustrated in FIGS. 1 through 3.

Pedal body 22 is biased in the counter-clockwise direction by the torsion spring 30 with respect to the cage 28 as shown in FIGS. 4 through 6, but counter-clockwise rotation is restricted by adjustment mechanism 32 as explained above. Normally, adjustment mechanism 32 is set so that each cleat clamping member of the front cleat engagement member 80 is positioned above its respective tread surface 53 of cage 28, and each rear cleat engagement member 81 is positioned below its respective tread surface 53 of cage 28. As a result, when the bicycle shoe 12 is placed on the pedal 10, the cleat 14 can be engaged with one of the front cleat engagement members 80 without the shoe sole interfering with the cage 28.

Figure 3:
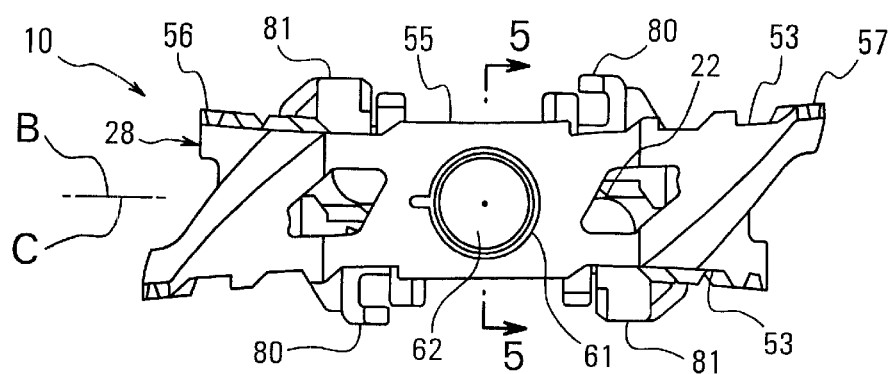
FIG. 3 is an outside elevational view of the right bicycle pedal illustrated in FIGS. 1 and 2.

Operation of the pedal 10 will now be described with reference to FIGS. 5 through 8. In a state in which the shoe 12 is not attached to the pedal 10, as shown in FIGS. 2 and 3, the front cleat engagement members 80 of pedal body 22 are biased by the torsion spring 30 so that they are positioned above the tread surfaces 53 of cage 28, while the rear cleat engagement members 81 are positioned below the cage 28. When bicycle shoe 12 is to be attached to the pedal 10, the tip of the shoe sole is moved forward toward front cleat engagement member 80 so that the tip of cleat 14 is inserted into one of the cleat clamping members. In this state, since each front cleat engagement member 80 is positioned above its respective tread surface 53 of the cage 28, the cage 28 does not get in the way of the tip of cleat 14 which can be easily inserted into the front cleat clamping member.

Once the tip of the cleat 14 has been inserted into one of the cleat clamping members 83 of the front cleat engagement member 80, force is applied to the heel side of the shoe 12, and the shoe 12 is pushed down toward the pedal 10. As a result, cage 28 and pedal body 22 rotate relative to each other against the biasing force of the torsion spring 30, and the two end up nearly parallel, as shown in FIGS. 5 and 7.

When the heel is pressed down further from this state, the rear end of the cleat 14 rotates the rear cleat engagement member 81 backward (the opposite direction from the arrow in FIGS. 7 and 8) against the biasing force of the springs 91, and the cleat 14 slides between the two cleat engagement members 80 and 81. Once the cleat 14 has slid between the two cleat engagement members 80 and 81, the rear cleat engagement member 81 is biased by the spring 91 back to its original position wherein a tongue of cleat engagement members 81 hits against a rotation stopper of cleat engagement member 80. As a result, the cleat 14 is engaged between the two cleat engagement members 80 and 81.

When the cleat 14 is engaged in the two cleat engagement members 80 and 81, the cage 28 is biased by the spring 30 forward with respect to the pedal body 22, the shoe sole comes into contact with side sections 54 and 55 of cage 28 as well as one of the end sections 56 and 57 of cage 28. As a result, the shoe sole is stabilized. Specifically, the shoe 12 resists leaning to the left or right by side sections 54 and 55 of cage 28, and the pedaling force is transmitted efficiently to the pedal 10. Thus, cage 28 provides a relatively wide tread surface 53 around the pedal body 22 to support the riders' foot. Since cage 28 and pedal body 22 rotate relative to each other, the front cleat engagement members 80 can always be positioned above tread surface 53 of cage 28 to permit easy engagement of cleat 14 with one of the cleat engagement mechanisms 24.

When the shoe 12 is placed on the pedal 10 in a state in which the cleat 14 is not engaged with one of the cleat engagement mechanisms 24, then pedal body 22 rotates and the cleat engagement mechanisms 24 retract to the position seen in FIG. 6. As a result, the shoe sole hits the wide tread surface 53, and the leg is able to move the pedal 10 in a stable attitude without wobbling to the left and right, so the function of a clipless pedal and the function of a double-sided pedal can both be realized with a single pedal. Accordingly, the pedaling force can be transmitted efficiently to the pedal 10 even in a state in which the cleat is not engaged during frequent cornering or in a state in which cleat engagement is impossible because of mud clogging during a race. Also, when the shoe is to be removed from the pedal 10, if the heel portion of the shoe 12 is lightly twisted to the outside, the rear cleat engagement member 81 will rotate to the rear against the energizing force of the spring 91, and the engagement of the rear end of the cleat 14 will be released instantly.

Figure 10:
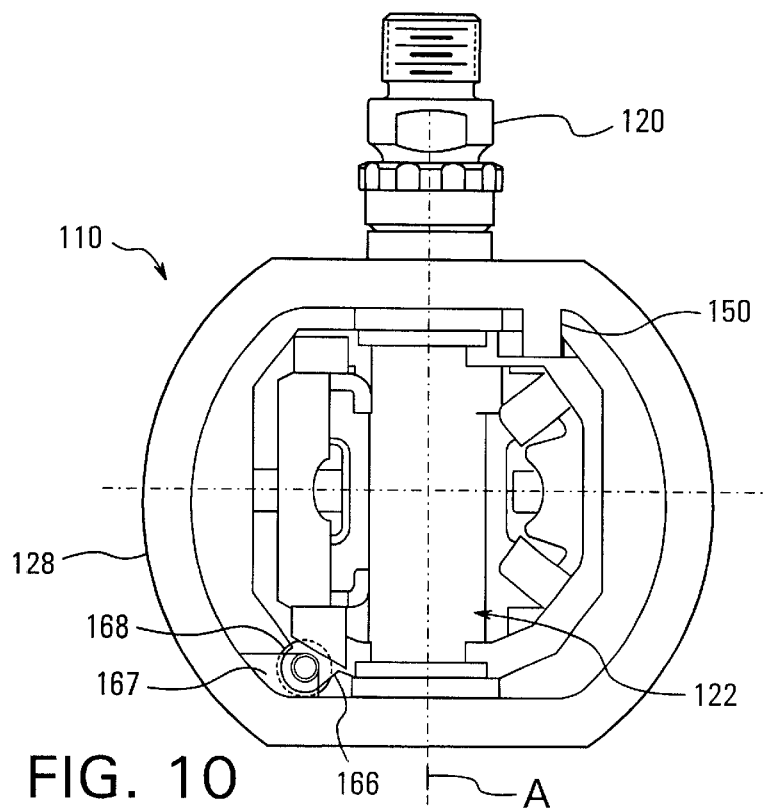
FIG. 10 is a top plan view of a right bicycle pedal with a clipless pedal body and a cage in accordance with a second embodiment with the adjustment mechanism set at 0°.
Figure 11:
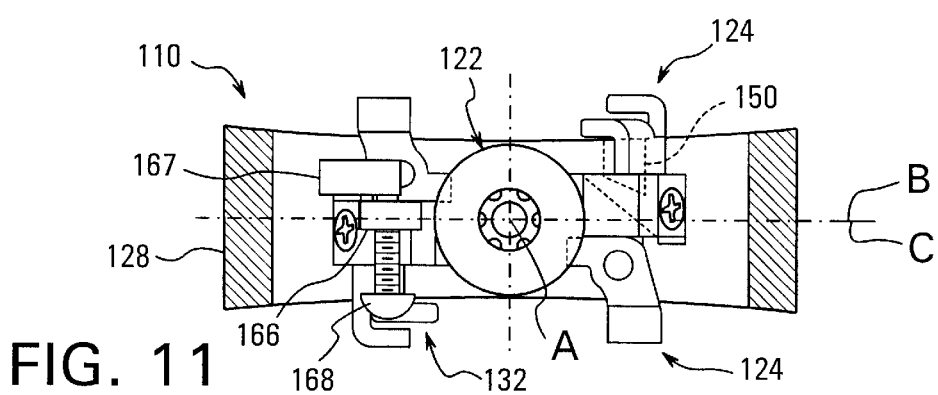
FIG. 11 is a cross-sectional view of the right bicycle pedal illustrated in FIG. 10 as seen along section line 11—11 of FIG. 10.
Figure 12:
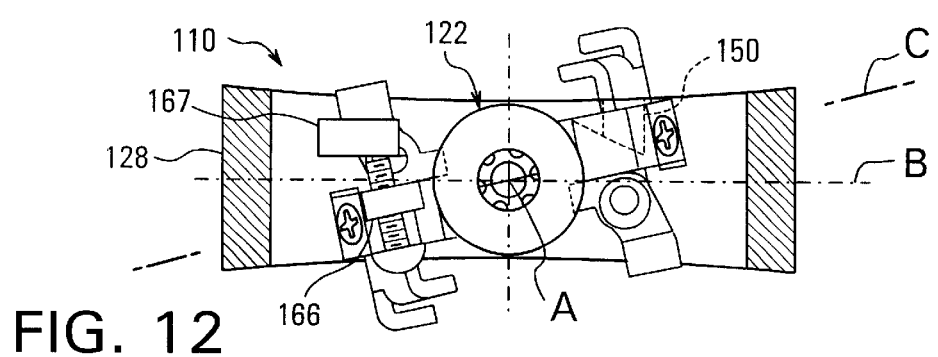
FIG. 12 is a cross-sectional view, similar to FIG. 10, of the right bicycle pedal illustrated in FIGS. 10 and 11 with the adjustment mechanism set at 12.5°.

Embodiment of FIGS. 10–12

A right bicycle pedal in accordance with a second embodiment of the present invention is illustrated in FIGS. 10–12. Bicycle pedal 110 is substantially identical to bicycle pedal 10 of the first embodiment, except that minor changes have been made to the shape of the pedal body 122, the cleat engagement mechanisms 124 and the cage 128. In view of the similarities between bicycle pedal 110 of the second embodiment and bicycle pedal 10 of the first embodiment, this second embodiment will not be discussed or illustrated in detail herein. Rather, only those features which significantly differ from the first embodiment will be described herein.

While the above is a description of various embodiments of the present invention, further modifications may be employed without departing from the spirit and scope of the present invention. For example, the shape of the cleat engagement members is not limited to that in the above embodiments, and the present invention can also be applied to cleats of other configurations. The configuration and position of the biasing means for biasing the tread cage and the linking can take many different forms. Similarly, the structure and position of the brace member are not limited to those in the above embodiment. The present invention can also be applied to a shoe in which the cleat projects out from the shoe sole, as in the case of a road-racing shoe. Since the sole of a shoe such as this is usually made from a relatively hard synthetic resin, the effect of the present invention at preventing looseness will be even better compared to a mountain bike shoe.

In this embodiment, adjustment mechanism 132 includes a first abutment 166 formed on pedal body 122, a second abutment 167 formed on cage 128, and an adjustment member or screw 168 interposed between abutments 166 and 167. Preferably, when screw 168 is fully threaded into abutment 166, such that stop member 150 engages pedal body 122, the relative angular position between center planes B and C of pedal body 122 and cage 128, respectively, is approximately 12.5°. When screw 168 is either removed or unthreaded so that the tip of screw 168 does not engage abutment 166, the relative angular position between center lines B and C of pedal body 122 and cage 128, respectively, is approximately 0°. In particular, abutments 166 and 167 engages one another to prevent further rotational movement therebetween. In other words, the angular position of pedal body 122 relative to cage 128 can be infinitely adjusted between at least 0° to at least 12.5°.

A biasing member (not shown) such as a torsion spring is coupled between pedal body 122 and cage 128. Specifically, the spring is preloaded such that pedal body 122 and cage 128 are biased in opposite directions. In particular, the spring biases pedal body 122 in a clockwise direction as seen in FIGS. 11 and 12, while cage 128 is biased in a counter clockwise direction by the spring. Rotational movement is limited by stop member 150 engaging pedal body 122. Accordingly, limited rotational movement is provided between pedal body 122 and cage 128. The amount of rotational movement between pedal body 122 and cage 128 is controlled by adjustment mechanism 132.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures.

What is claimed is:

1. A bicycle pedal adapted to be attached to a cleat of a bicycle shoe, comprising:
    a pedal shaft having a center longitudinal axis of rotation;
    a pedal body rotatably coupled to said pedal shaft with a first cleat engagement mechanism coupled to a first side of said pedal body;
    a cage with a first tread surface coupled to said pedal body; and
    an adjustment mechanism coupled between said pedal body and said cage to adjustably and selectively maintain said cage relative to said pedal body in at least two different relative angular positions, where said at least two different relative angular positions are measured between said pedal body and said cage relative to said longitudinal axis of rotation of said pedal shaft prior to engagement of the cleat that is adapted to be engaged with said first cleat engagement mechanism.

2. A bicycle pedal according to claim 1, wherein
    said cage is movably coupled to said pedal body with a biasing member coupled therebetween to bias said cage relative to said pedal body.

3. A bicycle pedal according to claim 2, wherein
    said biasing member is a torsion spring with a first end engaging a portion of said pedal body and a second end engaging a portion of said cage.

4. A bicycle pedal according to claim 3, wherein
    said torsion spring is located about said longitudinal axis of rotation.

5. A bicycle pedal according to claim 1, wherein
    said cage is rotatably coupled about said longitudinal axis of said pedal shaft.

6. A bicycle pedal according to claim 1, wherein
    said adjustment mechanism includes a screw movably coupled between said pedal body and said cage to selectively maintain one of said at least two different relative angular position between said pedal body and said cage.

7. A bicycle pedal according to claim 6, wherein
    said cage is movably coupled to said pedal body with a biasing member coupled therebetween to bias said cage relative to said pedal body.

8. A bicycle pedal according to claim 7, wherein
    said adjustment mechanism includes first and second abutments coupled to said pedal body and said cage, respectively, with said biasing member urging said first and second abutments together.

9. A bicycle pedal according to claim 8, wherein
    said first and second abutments are positioned to engage one another when said pedal body has a center plane parallel to said first tread surface of said cage.

10. A bicycle pedal according to claim 8, wherein
    said first and second abutments are positioned to engage one another when said first cleat engagement mechanism has a first front clamping member positioned above said first tread surface and a first rear clamping member positioned below said first tread surface.

11. A bicycle pedal according to claim 1, wherein
    said pedal body has a second cleat engagement mechanism coupled to a second side of said pedal body which faces in a direction opposite to said first side of said pedal body.

12. A bicycle pedal according to claim 1, wherein
    said first cleat engagement mechanism includes a front clamping member and a rear clamping member with at least one of said clamping members being movably coupled relative to said pedal body.

13. A bicycle pedal adapted to be attached to a cleat of a bicycle shoe, comprising:
    a pedal shaft having a center longitudinal axis of rotation;
    a pedal body rotatably coupled to said pedal shaft, and adapted for attachment to the cleat of the bicycle shoe;
    a cage movably coupled to said pedal body and adapted for engaging a sole portion of the bicycle shoe; and
    adjustment means for adjustably and selectively maintaining said cage relative to said pedal body in at least two different relative angular positions where said at least two different relative angular positions are measured between said pedal body and said cage relative to said longitudinal axis of rotation of said pedal shaft prior to engagement of the cleat that is adapted to be engaged with said first cleat engagement mechanism.

14. A bicycle pedal according to claim 13, wherein
    said cage is movably coupled to said pedal body by a biasing member coupled therebetween to bias said cage relative to said pedal body.

15. A bicycle pedal according to claim 14, wherein
    said biasing member is a torsion spring with a first end engaging a portion of said pedal body and a second end engaging a portion of said cage.

16. A bicycle pedal according to claim 15, wherein
    said torsion spring is located about said longitudinal axis of rotation.

17. A bicycle pedal according to claim 16, wherein
    said cage is rotatably coupled about said longitudinal axis of said pedal shaft.

18. A bicycle pedal according to claim 17, wherein said adjustment means includes a screw movably coupled between said pedal body and said cage to selectively maintain one of said at least two different relative angular positions between said pedal body and said cage.

19. A bicycle pedal according to claim 18, wherein said cage surrounds said pedal body.

20. A bicycle pedal according to claim 13, wherein said pedal body has a first cleat engagement mechanism coupled to a first side and a second cleat engagement mechanism coupled to a second side.

21. A bicycle pedal according to claim 20, wherein said first and second cleat engagement mechanism each includes a front clamping member and a rear clamping member with said front clamping members being movably coupled relative to said pedal body.

22. A bicycle pedal adapted to be attached to a cleat of a bicycle shoe, comprising:

a pedal shaft having a center longitudinal axis of rotation;

a pedal body rotatably coupled to said pedal shaft with a first cleat engagement mechanism coupled to a first side of said pedal body;

a cage rotatably coupled to said pedal shaft about said center longitudinal axis and movably coupled to said pedal body for limited movement relative to said first cleat engagement mechanism; and an adjustment mechanism coupled between said pedal body and said cage to adjustably and selectively maintain said cage relative to said pedal body in at least two different relative angular positions, where said at least two different relative angular positions are measured between said pedal body and said cage relative to said longitudinal axis of rotation of said pedal shaft prior to engagement of the cleat that is adapted to be engaged with said first cleat engagement mechanism.

23. A bicycle pedal according to claim 22, wherein said cage is movably coupled to said pedal body with a biasing member coupled therebetween to bias said cage relative to said pedal body.

24. A bicycle pedal according to claim 23, wherein said biasing member is a torsion spring with a first end engaging a portion of said pedal body and a second end engaging a portion of said cage.

25. A bicycle pedal according to claim 24, wherein said torsion spring is located about said longitudinal axis of rotation.

26. A bicycle pedal according to claim 22, wherein said adjustment mechanism includes an abutment coupled to one of said pedal body and said cage, and a screw threadedly coupled to one of said pedal body and said cage with said screw engaging said abutment.

27. A bicycle pedal according to claim 26, wherein said cage surrounds said pedal body.

28. A bicycle pedal according to claim 22, wherein said pedal body has a second cleat engagement mechanism coupled to a second side of said pedal body which faces in a direction opposite to said first side of said pedal body.

29. A bicycle pedal according to claim 22, wherein said first cleat engagement mechanism includes a front clamping member and a rear clamping member with at least one of said clamping members being movably coupled relative to said pedal body.

30. A bicycle pedal according to claim 23, wherein said adjustment mechanism includes a first and second abutments coupled to said pedal body and said cage, respectively, with said biasing member urging said first and second abutments together and a screw movably coupled between said pedal body and said cage to move said first and second abutments apart from each other.

31. A bicycle pedal according to claim 30, wherein said first and second abutments are positioned to engage one another when said pedal body has a center plane parallel to said first tread surface of said cage.

32. A bicycle pedal according to claim 30, wherein said first and second abutments are positioned to engage one another when said first cleat engagement mechanism has a first front clamping member positioned above said first tread surface and a first rear front clamping member positioned below said first tread surface.

* * * * *